(12) United States Patent
Irle et al.

(10) Patent No.: US 10,866,132 B2
(45) Date of Patent: Dec. 15, 2020

(54) METHOD AND APPARATUS FOR DETECTING THE LIQUID LEVEL IN A LIQUID RESERVOIR

(71) Applicant: HELLA GMBH & CO. KGAA, Lippstadt (DE)

(72) Inventors: Henning Irle, Lippstadt (DE); Ingo Niemeyer, Moehnesee (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 203 days.

(21) Appl. No.: 16/104,710

(22) Filed: Aug. 17, 2018

(65) Prior Publication Data

US 2018/0356271 A1 Dec. 13, 2018

Related U.S. Application Data

(63) Continuation of application No. PCT/EP2017/053409, filed on Feb. 15, 2017.

(30) Foreign Application Priority Data

Feb. 17, 2016 (EP) .................................... 16156174

(51) Int. Cl.
*G01F 23/18* (2006.01)
*G01F 22/02* (2006.01)
(Continued)

(52) U.S. Cl.
CPC .......... *G01F 22/02* (2013.01); *G01F 23/0061* (2013.01); *G01F 23/18* (2013.01); *G01F 17/00* (2013.01); *G01F 23/14* (2013.01)

(58) Field of Classification Search
CPC ...... G01F 17/00; G01F 22/02; G01F 23/0061; G01F 23/14; G01F 23/18
See application file for complete search history.

(56) References Cited

U.S. PATENT DOCUMENTS

| | | | | | |
|---|---|---|---|---|---|
| 1,945,203 | A | * | 1/1934 | Schiske | G01F 23/162 73/290 B |
| 3,060,735 | A | * | 10/1962 | Baker | G01F 17/00 73/149 |

(Continued)

FOREIGN PATENT DOCUMENTS

| DE | 897331 C | 11/1953 |
|---|---|---|
| DE | 2953903 C2 | 6/1985 |

(Continued)

OTHER PUBLICATIONS

International Search Report dated May 23, 2017 in corresponding application PCT/EP2017/053409.

(Continued)

*Primary Examiner* — David J Bolduc
(74) *Attorney, Agent, or Firm* — Muncy, Geissler, Olds & Lowe, P.C.

(57) ABSTRACT

A valve for connecting and disconnecting two fluid ports, that has a valve member which is movable between an open position, where the ports are in fluid communication and a first closed position where the first and second ports are not in fluid communication can be used to alter the volume of a gas being confined in a reservoir being connected to the valve, if the valve member can be moved into a second closed position in which the valve remains closed and the volume of a chamber being in fluid communication with the reservoir is altered.

7 Claims, 6 Drawing Sheets

(51) Int. Cl.
    *G01F 23/00*     (2006.01)
    *G01F 23/14*     (2006.01)
    *G01F 17/00*     (2006.01)

(56) References Cited

U.S. PATENT DOCUMENTS

| | | | | |
|---|---|---|---|---|
| 3,209,587 | A * | 10/1965 | Baldwin | G01N 7/00 73/149 |
| 3,394,590 | A * | 7/1968 | Napolitano | G01F 23/18 73/299 |
| 3,453,881 | A * | 7/1969 | Keng | G01F 17/00 73/149 |
| 4,182,178 | A * | 1/1980 | Nolte | G01F 23/00 73/299 |
| 4,354,383 | A * | 10/1982 | Hartel | G01F 9/001 73/290 B |
| 4,474,061 | A | 10/1984 | Parker | |
| 4,491,016 | A * | 1/1985 | Haefner | G01F 23/14 137/403 |
| 4,509,552 | A * | 4/1985 | Eicher | G01F 23/14 137/557 |
| 4,553,431 | A * | 11/1985 | Nicolai | G01F 17/00 73/149 |
| 4,561,298 | A * | 12/1985 | Pond | G01F 17/00 73/149 |
| 4,610,164 | A * | 9/1986 | Sobue | G01F 23/2965 340/621 |
| 4,770,033 | A * | 9/1988 | Nicolai | G01F 17/00 73/149 |
| 4,790,183 | A * | 12/1988 | Pfost | G01F 23/2966 367/908 |
| 4,840,064 | A * | 6/1989 | Fudim | G01F 23/14 141/83 |
| 4,869,097 | A * | 9/1989 | Tittmann | G01L 11/04 73/52 |
| 4,888,718 | A * | 12/1989 | Furuse | G01F 17/00 702/50 |
| 4,984,457 | A * | 1/1991 | Morris | B64G 1/402 73/149 |
| 5,105,825 | A * | 4/1992 | Dempster | A61B 5/4872 600/587 |
| 5,261,274 | A * | 11/1993 | Nemirow | G01F 17/00 324/668 |
| 5,303,586 | A * | 4/1994 | Zhao | G01F 23/164 250/900 |
| 5,349,852 | A * | 9/1994 | Kamen | A61M 5/162 137/101.31 |
| 5,465,629 | A * | 11/1995 | Waylett, Jr. | G01F 23/2962 73/864.16 |
| 5,535,624 | A * | 7/1996 | Lehmann | G01F 17/00 73/149 |
| 5,575,310 | A * | 11/1996 | Kamen | A61M 5/162 137/565.01 |
| 5,586,085 | A * | 12/1996 | Lichte | G01F 25/0061 367/99 |
| 5,697,346 | A * | 12/1997 | Beck | F02D 19/061 123/1 A |
| 5,726,355 | A * | 3/1998 | Sutherland | G08B 13/1609 340/566 |
| 5,824,892 | A * | 10/1998 | Ishii | G01F 17/00 73/149 |
| 6,450,153 | B1 * | 9/2002 | Perry | F02M 25/0809 123/198 D |
| 6,453,942 | B1 * | 9/2002 | Perry | F02M 25/0809 123/198 D |
| 6,460,566 | B1 * | 10/2002 | Perry | F02M 25/0809 123/519 |
| 6,470,861 | B1 * | 10/2002 | Perry | F02M 25/0809 123/518 |
| 6,470,908 | B1 * | 10/2002 | Perry | F02M 25/0809 123/518 |
| 6,474,313 | B1 * | 11/2002 | Perry | F02M 25/0809 123/518 |
| 6,474,314 | B1 * | 11/2002 | Perry | F02M 25/0809 123/519 |
| 6,478,045 | B1 * | 11/2002 | Perry | F02M 25/0809 123/519 |
| 6,484,555 | B1 * | 11/2002 | Perry | F02M 25/0809 200/83 R |
| 6,502,560 | B1 * | 1/2003 | Perry | F02M 25/0809 123/519 |
| 6,505,514 | B1 * | 1/2003 | Perry | F02M 25/0809 73/714 |
| 6,640,620 | B2 * | 11/2003 | Cook | F02M 25/0836 73/114.39 |
| 6,672,138 | B2 * | 1/2004 | Cook | F02M 25/0809 73/40.5 R |
| 6,708,552 | B2 * | 3/2004 | Weldon | F02M 25/0809 200/81.4 |
| 6,931,919 | B2 * | 8/2005 | Weldon | F02M 25/0818 73/114.39 |
| 6,948,481 | B2 * | 9/2005 | Perry | F02M 25/0809 123/516 |
| 6,951,131 | B2 * | 10/2005 | Sawert | B06B 1/0292 73/290 R |
| 6,983,641 | B1 * | 1/2006 | Perry | F02M 25/0809 200/83 Q |
| 7,010,974 | B2 | 3/2006 | Spanke et al. | |
| 7,281,644 | B2 * | 10/2007 | Cater | B05B 11/3025 222/321.2 |
| 7,843,199 | B2 | 11/2010 | Schulz | |
| 7,946,148 | B2 | 5/2011 | Getman et al. | |
| 8,448,665 | B1 * | 5/2013 | Anderson | G01F 23/16 137/557 |
| 8,763,453 | B2 | 7/2014 | Reimelt | |
| 9,429,461 | B2 | 8/2016 | Gebhardt et al. | |
| 2002/0050578 | A1 * | 5/2002 | Yashiro | G01F 23/18 250/573 |
| 2005/0126265 | A1 * | 6/2005 | Herzog | G01M 3/3236 73/49.2 |
| 2007/0068241 | A1 * | 3/2007 | Bains | G01F 17/00 73/149 |
| 2013/0325369 | A1 * | 12/2013 | Sofen | G01F 23/14 702/50 |
| 2014/0099224 | A1 * | 4/2014 | Ophardt | B05B 11/0054 417/545 |
| 2015/0057601 | A1 * | 2/2015 | Ly | A61M 1/28 604/28 |
| 2018/0345308 | A1 * | 12/2018 | Chandran | B08B 9/0328 |
| 2019/0086251 | A1 * | 3/2019 | Reuter | G01L 13/06 |

FOREIGN PATENT DOCUMENTS

| | | |
|---|---|---|
| DE | 3540768 C1 | 4/1987 |
| DE | 3913096 A1 | 10/1990 |
| DE | 4339933 A1 | 6/1994 |
| DE | 102004003893 A1 | 8/2004 |
| DE | 102004047413 A1 | 3/2006 |
| DE | 102014109836 A1 | 1/2016 |
| EP | 2759812 A1 | 7/2014 |
| JP | 2014020823 A | 2/2014 |
| WO | WO8302001 A1 | 6/1983 |

OTHER PUBLICATIONS

European Search Report dated Sep. 2, 2016 in corresponding application 16156174.1.

Hari Balakrishnan et al, "Modulation and Demodulation", Bits, Signals, and Packets, An Introduction to Digital Communications & Networks, Apr. 11, 2012, pp. 195-201, Retrieved from the Internet: URL:http://web.mit.edu/6.02/www/s2012/handouts/14.pdf.

* cited by examiner

METHOD AND APPARATUS FOR DETECTING THE LIQUID LEVEL IN A LIQUID RESERVOIR

This nonprovisional application is a continuation of International Application No. PCT/EP2017/053409, which was filed on Feb. 15, 2017, and which claims priority to European Patent Application No. 16156174.1, which was filed on Feb. 17, 2016, and which are both herein incorporated by reference.

BACKGROUND OF THE INVENTION

Field of the Invention

The invention relates to a method for determining a gas pressure inside a reservoir in response to a change of the reservoir volume, thereby enabling to determine the gas volume inside the reservoir. If the reservoir volume is known a priori, the volume of an incompressible liquid inside the reservoir can be calculated.

Description of the Related Art

Detection of fluid levels in reservoirs has a multitude of applications. It is particular critical in safely operating combustion engines drawing fuel from the reservoir. Numerous variants for detecting fluid levels have been reported, e.g. measuring the float level of a float gauge, capacitive fluid level detection (e.g EP 2759 812, which corresponds to U.S. Pat. No. 9,429,461, DE 102004047413 A1, which corresponds to U.S. Pat. No. 7,946,148), microwave fluid level detection (U.S. Pat. No. 8,763,453 B2, U.S. Pat. No. 7,843,199 B2), ultrasonic level detection based on propagation time measurements (e.g. U.S. Pat. No. 7,010,974 B2). All these methods are sensitive to changes of the orientation of the reservoir in space and or sloshing of the liquid inside the reservoir, which is often due to acceleration of the reservoir.

DE 29 53 903 suggests an indirect measurement of the fill level of a fuel reservoir by changing the fuel reservoir's volume and to measure the resulting change of the pressure inside the reservoir. Similar approaches have been suggested in U.S. Pat. No. 7,347,089 B1, DE 35 40 768 C1 (which corresponds to U.S. Pat. No. 4,770,033), DE 43 39 933 A1 or DE 897 331. This approach is based on the fact, that the fuel in the reservoir is essentially an incompressible liquid (herein briefly 'liquid') and that the 'empty' space is occupied by a compressible gas (herein briefly 'gas'), usually air, having the volume $V_g$. The gas follows Boyle-Mariott's law ($p \cdot V_g = c$; p symbolizes the pressure, V the volume, c is assumed to be constant during the measurement). Thus, the response of the pressure $p(V_g)$ to a change in volume $$\frac{\partial p}{\partial V_g} = -c \cdot V_g^{-2}$$

is a bijective function and accordingly, if the change in pressure $\partial p$ in response to a particular change in volume $\partial V_g$ can be measured, the volume of the gas $V_g$ inside the reservoir can be determined $$\left(V_g = \sqrt{-\frac{1}{c}\frac{\partial p}{\partial V_g}}^{-1}\right).$$

If the total volume of the reservoir $V_r$ is known a priory (i.e. usually by design), the volume of the incompressible liquid $V_l$ inside the reservoir and thus the reservoir's fill level can be calculated ($V_l = V_r - V_g$). Only for completeness is it noted that $\partial V_g = \partial V_r$, because during a measurement the liquid volume $V_l$ should be at least essentially constant (and/or at least known). At least essentially constant simply means the change of the gas volume $\partial V_g$ during a measurement is much bigger than the change of the liquid volume $V_l$, or mathematically $\partial V_r \gg \partial V_l$. Between the measurements the liquid can be drawn at any flow rate from the reservoir or refilled to the reservoir at any flow rate.

Although this approach is known for years and has the advantage of being independent of the orientation of the reservoir or sloshing of the liquid due to acceleration of the reservoir, there is no implementation commercially available. One drawback are simply the costs for reliably providing a well-defined change of the volume. Another problem is that with reducing liquid fill level the gas volume $V_g$ increases and thus the change in the pressure $\partial p / \partial V_g$ decreases. Thus, the measurement becomes more and more inaccurate, the more the reservoir becomes empty, i.e. in a situation where knowledge of the fill level becomes more and more important.

SUMMARY OF THE INVENTION

It is therefore an object of the present invention to provide a pressure change in response to change of the reservoir's volume, thereby enhancing fill level detection of a liquid reservoir, wherein the liquid is exchanged with a gas when drawing or refilling the liquid.

An exemplary embodiment of the invention provides a possibility to, for example, periodically alter the volume of the reservoir in particular by using a modified valve. The periodic alteration of the volume provides a periodic response of the pressure. By including the information about the temporal modulation of the gas volume ($V_g(t)$, t symbolizing the time) into signal processing of the pressure response signal (t), the pressure response signal can be distinguished from noise signals, i.e. the pressure response signal can be retrieved even if it is only of the order of magnitude of the noise and so to speak 'hides in the noise'. As it will become apparent below, altering of the volume does not necessarily need to be periodically, but this embodiment is particular instructive.

The apparatus for altering the volume of a liquid reservoir, comprises at least a valve. The valve has at least a first port being in fluid communication with the liquid reservoir and a second port. The second port can be connected e.g. with another reservoir, a vent opening, a combustion engine's manifold or the like. The valve has a conduit for enabling a liquid communication between the first and the second port. The liquid communication can be controlled, i.e. the valve can be opened or closed by moving, e.g. displacing or rotating a valve member. The valve member has an open position in which the first port and the second port are in fluid communication via said conduit. The valve member further has a first closed position, in which the fluid communication between the first port and the second port is blocked by the valve member. Further, the valve member is moveable into at least a second closed position, in which the fluid communication between the first port and the second port remains closed, i.e. blocked, as well by the valve member, for example. Moving the valve member or a part thereof between the first and second closed positions changes the volume of a chamber being in fluid communication with the first port and thus with the reservoir. In other words, by simply moving the valve member forth and back from the first closed position to the second closed position the volume of the compressible gas inside the reservoir is iteratively changed and the corresponding pressure response can be measured using an available pressure sensor. As apparent, during this movement, the valve remains closed. Briefly summarizing, the valve member or a part thereof restricts a chamber being in fluid communication with the reservoir, e.g. via the first port. Moving of the valve member thus changes the chamber volume and thus the effective volume of the reservoir. Accordingly, the first port can be in fluid communication with a chamber, into which the valve member protrudes, when the valve member or at least a part thereof protrudes when it is moved from its first to its second closed position.

The valve member and/or a movable part thereof can be operated by a drive, i.e. an actuator, e.g. a solenoid drive, a rotary drive or the like.

Briefly summarizing, the valve has a valve member being movably supported, e.g. in a valve housing, thereby enabling its movement for opening or closing of the valve has at least two closed positions. By iteratively moving the valve member or at least a part of it from one of these two closed positions into the other closed position, the volume of the chamber and thus the reservoir can be iteratively altered. Iteratively moving the valve member between these two closed positions thus enables to e.g. periodically alter the volume $V_g(t)$ and thus the pressure $p(t)$ of the compressible gas inside the reservoir as function of time t.

The pressure sensor can be integrated in the apparatus, thereby reducing manufacturing cost as well as installation costs. For example, the apparatus may comprise a sensor, said sensor measuring a signal being representative for the force F required the move the valve member against the pressure in the reservoir from the first to the second closed position and/or from the second to the first closed position. As the surface A of the valve member being exposed to the pressure $p(t)$ in the reservoir is known by design, the pressure can be calculated simply using $$p = \frac{F}{A}.$$

in an example, the signal being representative for the force F is the voltage and/or the current feed to a drive for moving the valve member between the first and second closed position.

The reservoir can be a fuel tank of a combustion engine. The valve can be e.g. a Fuel Tank Isolation Valve (commonly FTIV) for controlling a fluid communication between the reservoir and the environment (usually via a filter, e.g. an activated charcoal filter, like an activated carbon canister), a Fuel Tank Vent valve for controlling a fluid communication between the reservoir and an engine air intake, e.g. the engine's intake manifold, a Fuel Tank Separation Valve for isolating the reservoir from the engine, a canister and environment during canister purging, an Atmospheric Isolation Valve for isolating a canister and/or the reservoir from the atmosphere to prevent gas emissions after shutoff or a Fuel Tank Shutoff Valve for controlling fluid communication between a combustion engine and the reservoir. Valves like these are already standard in modern combustion engine powered apparatuses, like cars, piston aircraft, motorcycles, power stations. Thus, by simply replacing the prior art valves, the fill level of the fuel reservoir can be determined easily. There are no additional costs for extra power supply cables or other installation costs that would be required if a separate volume modulation unit would be used. Beyond, the costs for the valve according to the invention are, if at all, only slightly higher than the costs for the prior art valves. In any case, the additional costs are significantly lower as for prior art volume modulators. In an example, the reservoir is a reductant reservoir for providing a reductant to an exhaust gas for denitrification of the exhaust gas. Typical reductants are anhydrous ammonia, aqueous ammonia or an aqueous urea solution as required for selective catalytic reduction of nitrogen oxides. Such liquids are commonly referred to e.g. as 'AdBlue®' (Europe) or Diesel Exhaust Fluid, briefly DEF (USA).

For example, the conduit may comprise a valve seat and the valve member closes the valve seat in its first and second closed positions and opens the valve seat when moved in its open position. An elastic gasket may seal the valve seat in the closed positions. In other words the elastic gasket is positioned between a gasket facing contact surface of the valve member and the valve seat. The valve member presses the gasket against the valve seat. By displacing the valve member from the first closed position into the second closed position the elastic gasket is compressed. If the valve member is positioned between the first port and the valve seat, compressing the gasket augments the volume of the chamber being in fluid communication with the first port and thus reduces the pressure in the chamber and thus the gas volume. When moving the valve member from the second closed position to the first closed position, the gasket expands and thus the volume of the chamber is reduced. Accordingly, the pressure in the chamber and thus as well in the reservoir is augmented. If the valve member is positioned at the other side, i.e. between the second port and the valve seat, compressing the gasket results in a reduced volume of the chamber being in fluid communication with the first port and thus the reservoir and thus essentially of the reservoir. Accordingly, the pressure in the reservoir is augmented. Moving the valve member back in its first closed position, the gasket expands; accordingly the gas volume is augmented and the pressure reduced. In this example, we assumed for simplicity only that the valve member does not protrude through the valve seat, but of course it can. In this case one would have to consider the position of a gasket facing contact surface for contacting the gasket and not the complete valve member.

In another example, the valve member can comprise at least a section of the conduit. The conduit has at least a first opening being positioned in front of the first port and a second opening being positioned in front of a second port if the valve member is in its open position, to thereby provide said fluid communication. Of course the conduit openings do not need to be directly in front of the respective ports, but the ports should be in liquid communication with openings of the conduit and thus with each other. As already explained above, the first port can be in fluid communication with a chamber, into which the valve member protrudes, when the valve member is moved from its first to its second closed position. The boundary of the chamber closes at least one of said first and/or second openings of the conduit, when moving the valve member from its open position into its first and/or second closed positions. For example, the valve member could be or resemble a piston, being movably supported in a cylinder. The conduit may extend e.g. perpendicular (but of course as well oblique) through the piston. The first and second ports can be provided by through holes in the cylinder wall. The through holes are positioned to be connected by the conduit, if the valve member is in its open position. If the valve member is advanced or retracted, i.e. axially moved in the cylinder, and/or rotated the through holes are closed by the piston. The cylinder provides a chamber, being enclosed by the piston. Said chamber is connected, e.g. by a tube or any other kind of conduit, to the first port. Thus advancing (or retracting) the valve member, briefly any axial movement alters the volume of the chamber and thus of the gas. The pressure response can be detected by any pressure sensing means and thus the gas volume $V_g$ can be determined. Summarizing, the volume of the chamber can be augmented or reduced. For example the volume may be oscillated, by oscillating the valve member. The corresponding pressure thus oscillates accordingly.

In a further example, the valve can comprise a chamber being in fluid communication with the first port. The valve member is rotably supported and comprises a conduit for connecting said first and second ports. By rotating the valve member, a ring segment is inserted into said chamber, thereby closing the second port. Further rotation of the valve member reduces the volume of the chamber and thus enables to compress the gas in the chamber and thus in the reservoir. The pressure response can be detected as explained above.

The above explained valves enable to repetitively compress and decompress a gas being confined in a reservoir according to an arbitrary but well known signal S(t), wherein S(t) symbolizes a measure for the change of the volume relative to a reference volume $V_0$ as a function of time (in the simplest case $V_g(t)=V_0+\Delta V \cdot S(t)$). This signal is subsequently referred to as initial signal S(t) or reference signal S(t). The initial signal S(t) may be periodic but is not necessarily periodic, but is not constant during a measurement. Accordingly, the method for determining a pressure response p(t) of a gas being confined in a reservoir comprises repetitively reducing and augmenting the gas volume $V_g(t)$ as function of time. For example the gas volume may be altered periodically, e.g.: $V_g(t)=V_0+\Delta V \cdot \sin(\omega t)$ (i.e. in this example $S(t)=\sin(\omega t)$, wherein co is the angular frequency and t the time).

Thereby the gas is compressed and/or decompressed according to the initial signal S(t). During said altering of the gas volume according to the initial signal S(t) a pressure signal p(t) being representative for the pressure inside the reservoir is measured as function of time t. For example, the pressure signal p(t) may be the signal provided by a pressure sensor, e.g. after an optional amplification. This pressure signal p(t) is demodulated, e.g. using the initial signal S(t) as reference signal and thereby a demodulated pressure signal $p_d(t)$ is obtained. In particular, if the initial signal is periodic, a previously detected pressure signal $p(t-\tau)$ may be used for demodulation the pressure signal as well. As usual, $\tau$ denotes a time shift. Subsequently, the demodulated signal can be subjected to a low pass and/or a band pass filter, thereby eliminating remaining noise. The such obtained pressure signal $p_d(t)$ can be used to determine $\partial p/\partial V$ and thus $V_g$.

Due to the correlation of the signal S(t) and the pressure signal p(t) pressure changes far below the noise level (i.d. signal to noise levels of down to 1 to 1e6) can be detected with high accuracy. In other words, the pressure amplitudes can be significantly smaller compared to prior art techniques. For producing these low amplitude volume variations the above explained valve is sufficient, whereas according to the prior art much bigger volume modulations have been necessary (and of course could still be used, provided the volume is altered as explained above). In other words, the reservoir volume can be in fluid communication with the first port of the valve explained above. Repetitively altering the volume according to the initial signal S(t) can be obtained by altering the position of the valve member between at least two of said closed positions.

The initial signal S(t) can be a periodic function. In an embodiment, $S(t)=V_0 \cdot \sin(\omega(t+\delta t))$, wherein $\omega$ denotes an angular frequency, and $\delta t$ a time shift. More generally the initial signal can be expressed as $S(t)=\Sigma_i^{imax} \alpha_i \sin(\omega_i(t+\delta t_i))+\beta_i \cos(\omega_i(t+\delta t_i))$, wherein i is an integer index. $\alpha_i$, $\beta_i$, $\omega_i$ and $\delta t_i$ are constants.

The pressure signal p(t) can be amplified prior to its demodulation to thereby simplify processing of the pressure signal p(t).

The step of demodulation may comprise multiplying the initial signal S(t) with the pressure signal p(t), thereby obtaining a demodulated pressure signal. Multiplication can be performed digital, i.e. numerically or by an analog mixer. In an embodiment the initial signal S(t) may be a square signal and demodulation may comprise synchronous amplification of the pressure signal p(t) and subsequent integration, thereby essentially eliminating the noise from the signal.

Integration of the multiplied pressure signal $p_m(t)$ eliminates noise in the response signal, as the integral over a noise signal vanishes.

To determine an estimate for $\partial p/\partial V_g$ it is advantageous to perform the measurement of p(t) twice but with different volumes changes $\Delta V_1$ and $\Delta V_2$. The estimate for $\partial p/\partial V_g$ can be obtained by simply calculating $$\frac{\partial p}{\partial V_g} \approx \frac{p_{d,1}-p_{d,2}}{\Delta V_1 - \Delta V_2},$$

wherein $p_{d,1}$, $p_{d,2}$ are the demodulated pressure signals corresponding to $\Delta V_1$ and $\Delta V_2$, respectively.

In another example, the angular frequency of the reference signal S(t) is varied. Observing the frequency dependency of the demodulated pressure signal enables to determine the resonance frequency of the volume modulation, i.e. the frequency where the absolute value of the pressure response shows a maximum. This resonance frequency enables to determine the gas volume inside the reservoir as well, e.g. using a look-up table.

Above, it has been assumed that it is not necessary to explicitly explain that the movement and thus the position of the valve member can and in practice will be controlled electrically, e.g. by a (micro) controller operating a drive being operationally connected with the valve member to move it according to the controller's commands.

Further, pressures and forces are vectors, but for simplicity they have been treated like scalars.

As apparent for the skilled person and only mentioned for completeness, the reservoir should be closed when altering the volume to measure the response of the pressure. At least, the leakage should be small compared to the change in volume, or in other words the mass of the gas and the liquid in the reservoir should be kept at least almost constant during a measurement. Further, the method does not only enable to determine the fill level of a reservoir, but as well to determine the volume of an 'empty' enclosed reservoir, by simply connecting the first port to the reservoir and operating the apparatus as set out above. 'Empty' means the there is only a compressible fluid inside the reservoir. Connecting means here to enable a fluid communication between the reservoir and the first port.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
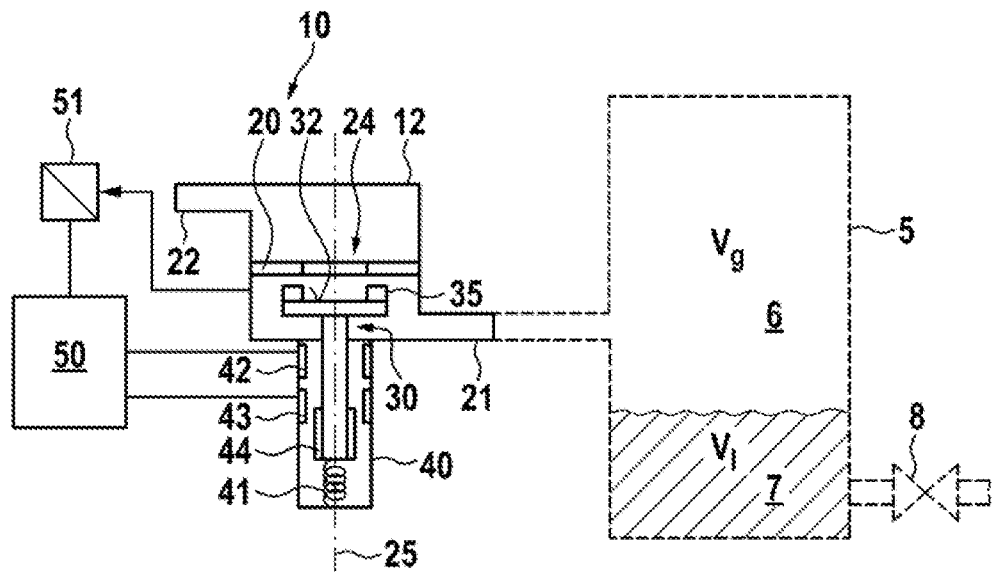
FIGS. 1a to 1c show a first a valve.

FIG. 1 shows a valve 10 with a valve housing 12 having a first port 21 and a second port 22. At least one of the ports can be connected to a reservoir 5. Subsequently we assume that the first port 21 is connected to the reservoir 5 as indicated by a dotted line 5. The reservoir 5 is not drawn to scale, in practice its volume $V_r$ is much larger than the volume enclosed by the valve. An incompressible liquid 7 may occupy a volume $V_l$ inside the reservoir 5. The remaining volume $V_g$ is filled with a compressible gas 6. If the valve 10 is open, as shown in FIG. 1a, the reservoir 5 is in fluid communication with the second port 22. The reservoir 5 may have additional openings as indicated by a second valve 8.

Figure 1B:
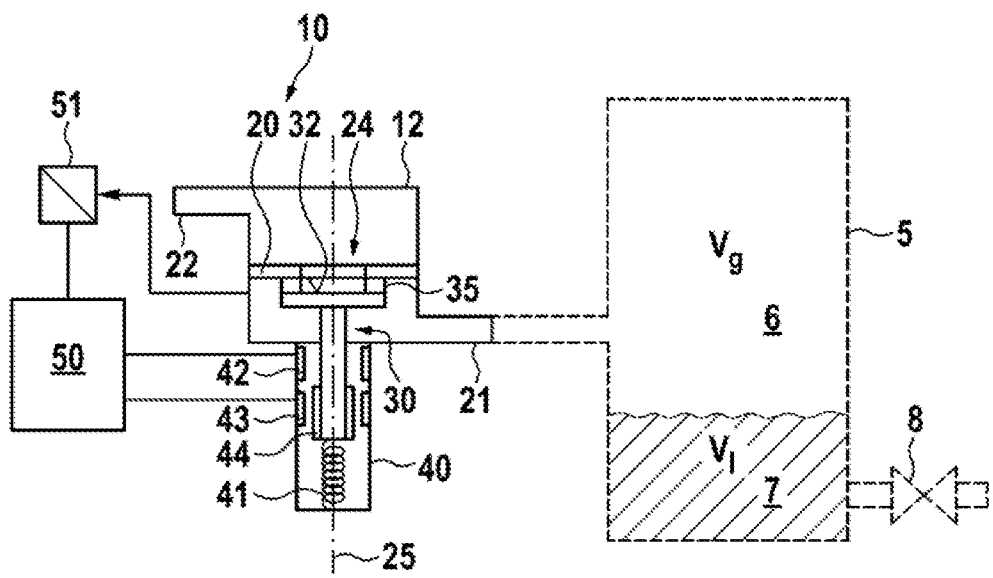
Figure 1C:
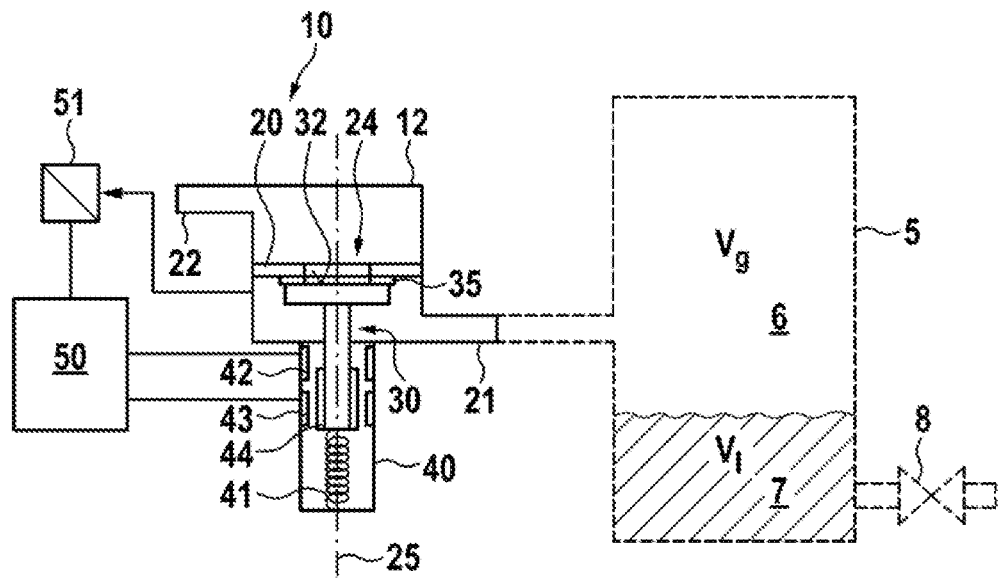

The valve 10 has a valve seat 20 with an opening 24 providing a conduit having a longitudinal axis 25. A valve member 30 is movably supported inside the housing, enabling a movement along or at least essentially parallel to the longitudinal axis 25. The valve member 30 has a valve seat facing side 32 supporting an elastic gasket 35. A translation, i.e. a movement of the valve member 30 enables to bring the gasket 35 in contact with the valve seat 20, thereby closing the opening 24. The valve 10 is thus closed and the valve member 30 is now in a first closed position, which is depicted in FIG. 1b. For example, the valve member 30 pushes the gasket with a first force $f_1$ against the valve seat 20, to ensure a sealing contact between the gasket 35 and the valve seat 20 as well as between the valve member 30 and the gasket 35. As can be seen in FIG. 1c, the force for pressing the gasket 35 against valve seat 20 can be augmented to a force $f_2$ until the elastic gasket is deformed as depicted in FIG. 1c. Now, the valve member 30 is in a second closed position. Due to the corresponding movement, i.e. the stroke of the valve member, the gas volume $V_g$ is slightly increased, e.g. by a few milliliters. Accordingly, a slight pressure drop can be measured inside the reservoir 5, e.g. using a pressure sensor 51 being coupled to a controller 50 (for a more detailed example, see FIG. 5). By reducing the force which is applied to the gasket back to the first level $f_1$, the valve member reciprocates back into its first closed position, resulting in a slight pressure rise, being measurable as well by the pressure sensor 51.

The valve member 30 can be actuated by a linear drive as indicated in FIG. 1a to FIG. 1c. The linear drive has a drive housing 40 supporting a spring 41 being coupled to the valve member 30. The spring 41 can be a pull-spring as indicated or as well a push spring. In the latter case is should be repositioned accordingly. Further, at least one coil 42, 43 (depicted are two coils, a first coil 42 and a second coil 43) is attached to the drive housing. The valve member 30 comprises a plunger of a dia- or ferromagnetic material as indicted by reference numeral 44. By applying a current $l_1$ to at least one of the coils 42, 43 the valve member can be moved against the spring force into its first closed position indicated in FIG. 1b. By increasing the current to a second current $l_2$ and/or by applying the current to both coils, the force exerted by the valve member 30 to the gasket 35 can be increased to the higher value $f_2$ and thus the valve member translates into its second closed position (as can be seen in FIG. 1c). The current through the coils can be controlled by the controller 50 as indicated by corresponding lines. Reducing the current back to $l_1$ (and/or switching the second coil off, respectively) enables to reduce the force back to $f_1$, i.e. the spring and the elastic gasket 35 move the valve member 30 back into its first closed position (see FIG. 1b). Switching the coils 42, 43 off completely, results in opening the valve 10 (see FIG. 1a).

Figure 2A:
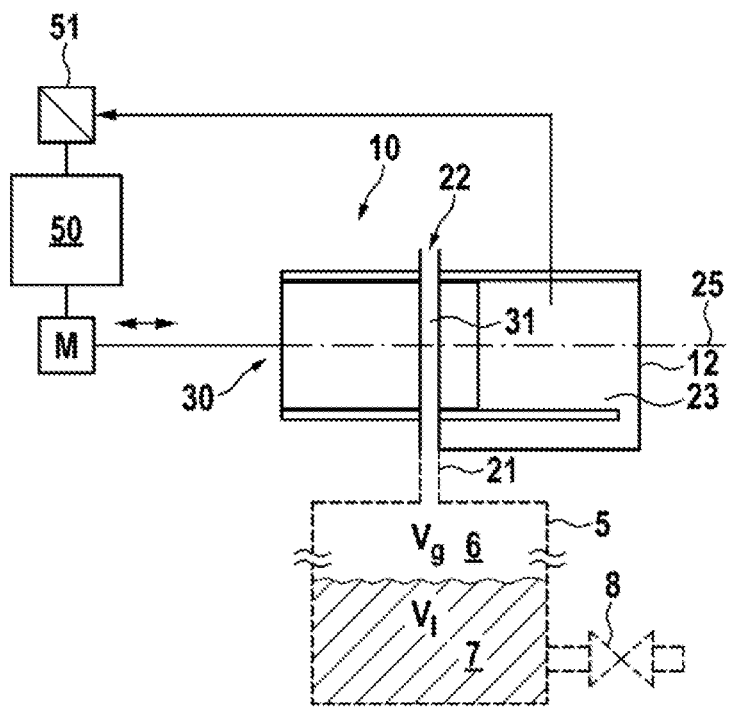
FIGS. 2a to 2c show a second valve.
Figure 2B:
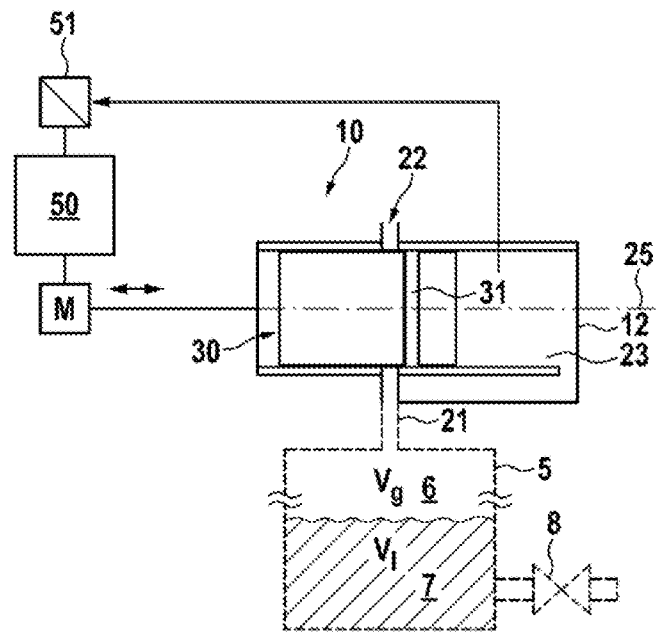
Figure 2C:
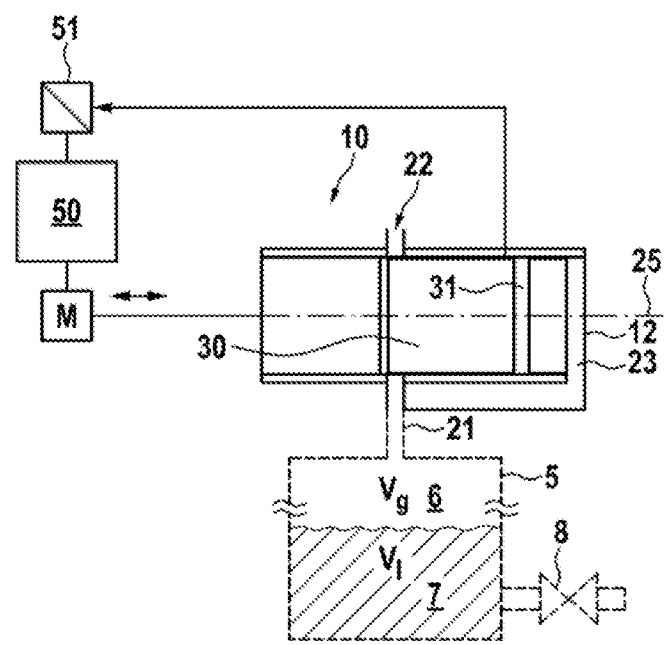

FIGS. 2a to 2c show a further embodiment of an apparatus according to the invention: A valve 10 has a valve housing 12 having a first port 21 and a second port 22. At least one of the ports 21, 22 can be connected to a reservoir 5. Subsequently we assume that the first port 21 is connected to the reservoir 5 as indicated by a dotted line. The reservoir 5, in practice its volume $V_r$ is much larger than the volume enclosed by the valve. An incompressible liquid 7 may occupy a volume $V_l$ inside the reservoir 5. The remaining volume $V_g$ is filled with a compressible gas 6. If the valve 10 is open, as shown in FIG. 1a, the reservoir 5 is in fluid communication with the second port 22 via a conduit 31. Again, the reservoir 5 may have additional openings as indicated by a second valve 8.

The valve member 30 has a conduit 31. In the position as shown in FIG. 2a the conduit 31 connects the first and the second ports 21, 22, or in other words it provides a liquid communication between the first and second ports 21, 22. By moving the valve member 30 forth or back in the housing, the liquid communication can be interrupted as shown in FIG. 2b and FIG. 2a. The valve member 30 is mechanically coupled to a drive M for pushing or pulling, i.e. moving the valve member as required. A controller 50 controls the e.g. linear drive M and thus the movement of the valve member 30

The valve housing 12 has a chamber 23 being in fluid communication with the first port 21. When moving the valve member 30 inside the housing, the volume of the chamber 23 and thus of the first port 21 can be reduced as shown in FIG. 2b and FIG. 2c. Thus reduction leads to an augmentation of the gas pressure pressure p inside the chamber 23, the first port 21 and the reservoir 5. This change in pressure can be detected using a pressure sensor 51 being connected to a controller 50 as already explained with respect to FIG. 1a to FIG. 1c.

Figure 3A:
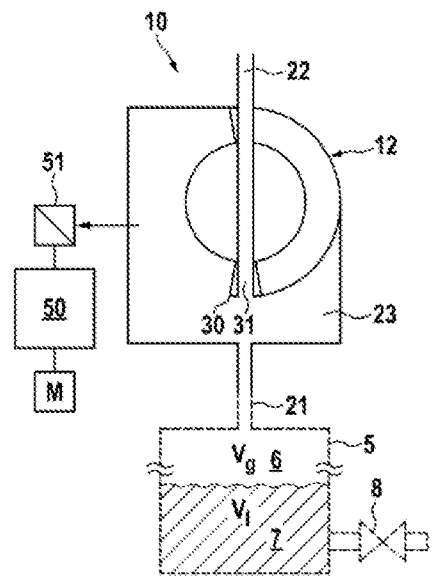
FIGS. 3a to 3c show a third valve.
Figure 3B:
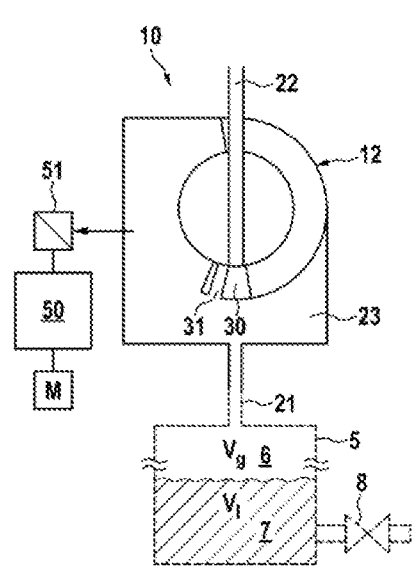
Figure 3C:
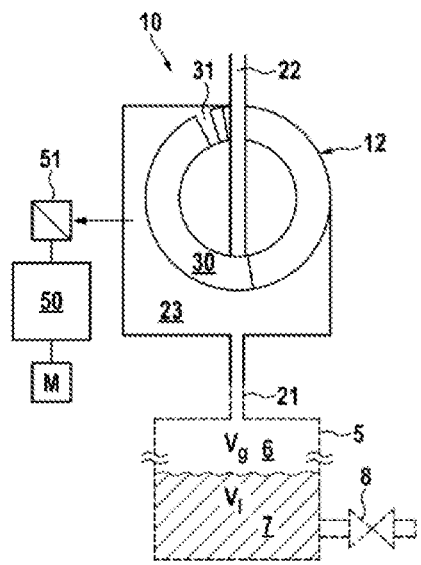

The valve in FIG. 3a to FIG. 3c has like the valves in FIG. 1a to FIG. 2c a valve housing 12 herein with a first port 21 and a second port 22. Like in the examples above, the first port 21 is configured to be connected to a reservoir 5. The first port 21 and the second port 22 can be connected, or in other words set in fluid communication by positioning a conduit 31 of a ring segment like valve member 30 in between of the ports 21, 22 as shown in FIG. 3a. By rotating the valve member 30, it blocks the second port 22 as shown in FIG. 3b and FIG. 3c: By rotating the valve member 30, the valve member enters a chamber 23 being in fluid communication with the first port 21 and thus with the reservoir 5. Thus, depending on the (angular) position of the valve member 30, volume $V_g$ can be varied. The pressure p(t) inside the chamber 23 and thus the reservoir 5 varies inversely proportional ($p(t)=c/V_g(t)$), (provided reservoir 5 is connected and closed). The pressure p(t) can be detected using a pressure sensor 51 and the corresponding pressure signal p(t) can be evaluated by a controller 50. The controller may control a drive M for moving the valve member in addition.

As apparent from the above the term 'port' does not only refer to an opening in an enclosure of some space enabling a fluid communication with e.g. between the space and the reservoir or the environment, but as well denotes the enclosed space or so to speak a conduit enabling the fluid communication, e.g. between a chamber inside the valve housing and the reservoir.

Figure 4A:
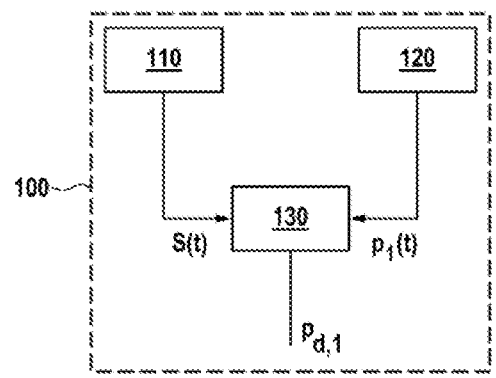
FIGS. 4a to 4c show examples of a method.

Referring to FIG. 4a the method according to the invention is explained based on an example 100. The method comprises, varying the volume $V_g(t)$ of a gas being a confined in a reservoir according to a reference signal S(t), mathematically speaking $V_g(t)=V_0+\Delta V \cdot S(t)$, wherein $V_0$ is an offset and $\Delta V$ a measure for the amplitude (Step 110). As explained above, the reference signal is not necessarily periodic, but preferably. For example, the reference signal S(t) can be square-wave signal (like e.g. $S(t)=\text{Sign}(\sin(\omega t+\varphi))$, a sinusoidal signal (e.g. $S(t)=\Sigma_i \alpha_i \sin(\omega_i t+\varphi_i)$) or a superposition of different signals. The reference signal S(t) can even be a noise signal. In any case, the theoretic pressure is $p_{th}(t)=c/(V_0+\Delta V \cdot S(t))$. In step 120, the pressure p(t) is measured using a pressure sensor providing a first pressure signal $p_1(t)$. (As apparent we do not distinguish here between the pressure and a signal representing the pressure.) For example, the pressure sensor may provide a voltage being proportional to the pressure. This voltage signal can be amplified and/or filtered and/or provided to an analog digital converter as required. In any case, the pressure signal $p_1(t)$ is demodulated using the reference signal $S(t-\tau)$ in step 130. Demodulation can be obtained for example using a mixer or numerically. Demodulation provides a demodulated pressure signal $p_{d,1}(t)$ with a significantly enhanced signal to noise ratio. Mathematically the demodulated pressure signal can be expressed e.g. as $$p_d(\tau) = \frac{1}{\Delta t}\int_{t_0}^{t_0+\Delta t} S(t-\tau) \cdot p(t-\tau_d) dt.$$

The bigger $\Delta t$, the better is the noise reduction. The delay-offset $\tau_d$ is a parameter showing that the measured signal has a phase offset due to electronical and physical delays. The offset r is to be adjusted to maximize the signal to noise ratio. Or in other words, $S(t-\tau)$ and $p(t-\tau_d)$ should be in phase. Since the offset $\tau_d$ is usually not known a priori nor is it necessarily constant over all environmental parameters, e.g. like environmental temperature or atmospheric pressure, it is favorable to perform two calculations with the above formula for two different phase-offsets $\tau$, one can be performed e.g. with $\tau_1=0$ and one with e.g. $T_2=\pi/2$. Thus one gets two orthogonal vector components $X=p_d(\tau,\tau_d=\tau_1)$ and $Y=p_d(\tau, \tau_d=\tau_2)$ which can be further processed to an absolute signal value $p_{d,1}=\sqrt{X^2+Y^2}$ and a phase value $$\phi = \tan^{-1}\left(\frac{Y}{X}\right).$$

The corresponding pressure is briefly referred to as simply $p_{d,1}$.

Figure 4B:
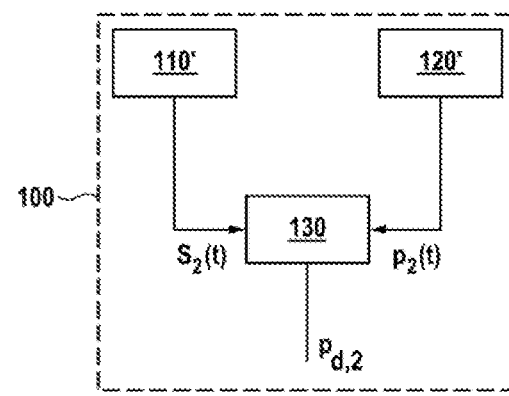

The method can further comprise varying (modulating) the gas volume as well using a different second $\Delta V$, i.e. $V_g(t)=V_0+\Delta V_2 \cdot S_2(t)$, wherein $\Delta V=\Delta V_1 \neq \Delta V_2$ and $S_2(t)$ is a second reference signal (Step 110', see FIG. 4b) and to measure the corresponding second pressure signal $p_2(t)$ (Step 120' see FIG. 4b). The corresponding pressure signal $p_2(t)$ can as well be demodulated (Step 130') but of course the second reference signal $S_2(t)$ has to be used to obtain $p_{d,2}$.

Figure 4C:
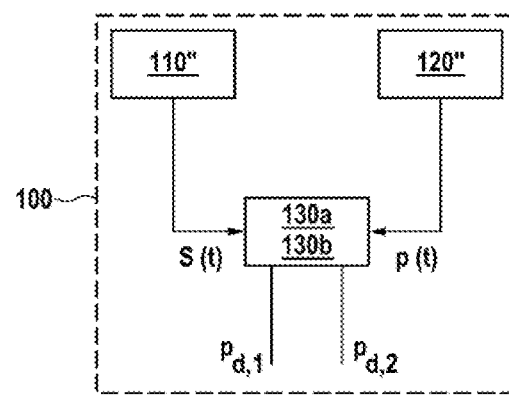

In an example (cf. FIG. 4c), the first and the second modulation of the gas volume are performed at the same time, but with different reference signals $S_1(t)$, $S_2(t)$, i.e $V_g(t)=V_0+\Delta V_1 \cdot S_1(t)+\Delta V_2 \cdot S_2(t)$, wherein $S(t)=S_1(t)\neq \gamma \cdot S_2(t)$ $\forall \gamma$ and $\gamma$ is a constant (Step 110''). The corresponding pressure signal p(t) is again measured (Step 120'') but demodulated twice, once using the first reference signal $S_1(t)$ (Step 130a) and once using the second reference signal $S_2(t)$ (Step 130b). Summarizing, demodulation takes place using only the first or second reference signal $S_{1(t)}, S_{2(t)}$, respectively, to thereby obtain the respective first and second demodulated pressure signals $p_{d,1}, p_{d,2}$. Thus, an estimate for $\alpha p/\partial V_g$ can be obtained as $$\frac{p_{d,1} - p_{d,2}}{\Delta V_1 - \Delta V_2},$$

i.e.

$$\frac{\partial p}{\partial V_g} \approx \frac{p_{d,1} - p_{d,2}}{\Delta V_1 - \Delta V_2}.$$

Figure 5:
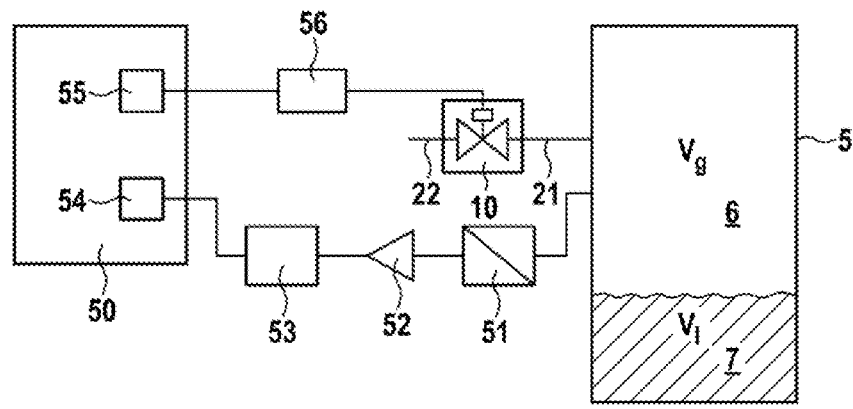
FIG. 5 shows a control circuit diagram.

The above explained method(s) may be implemented using a circuit according to the simplified circuit diagram depicted in FIG. 5. As already indicated above, the circuit comprises a controller 50 configured for digital signal processing. The controller may thus comprise a microprocessor or a number of interacting microprocessors. The controller 50 comprises a signal generator 55 configured to provide at least a first reference signal S(t) to a driver 56. The driver 56 drives and thus controls the movement of a valve member 30 of the valve 10. The valve 10 can be e.g. one of the valves as depicted in FIGS. 1-3. Briefly, the valve 10 comprises a movable valve member 30 with an open position in which the first port 21 and the second port 22 are in fluid communication via a conduit. From this open position, the valve member 30 is movable into a first closed position, in which the fluid communication between the first port 21 and the second port 22 is blocked by the valve member 30 (cf. e.g. FIGS. 1b, 2b and 3b). In addition, the valve member is movable into at least a second closed position, in which the fluid communication between the first port 21 and the second port 22 is as well blocked and in which the volume of a chamber being in liquid communication with the first port 21 is altered when moving the valve member 30 from the first closed position to the second closed position and/or from the second to the first closed position. As explained above, the movement of the valve member 30 enables to changes the volume $V_r$ of a reservoir 5 being connected to the first port of the valve 10. In fact, of course the volume $V_r$ of the reservoir remains constant, but as the first port 21 of the valve 10 is connected to the reservoir volume the movement of the valve member has the same effect, i.e. the pressure inside the reservoir changes accordingly. This change in pressure is detected by a pressure sensor 51 being in fluid communication with the reservoir 5. The corresponding pressure signal p(t) is amplified by an amplifier 52 and optionally filtered, e.g. by a low pass filter 53 to avoid aliasing effects when subsequently digitizing the signal in a digital to analog converter 54 (AD-converter). The digitized pressure signal can be processed by the controller 50. In the figure, the AD-converter 54 and as well the signal generator 55 are included in the controller 50, but they do not need to be integrated into a single chip or on a single PCB, but may be separate units.

Figure 6:
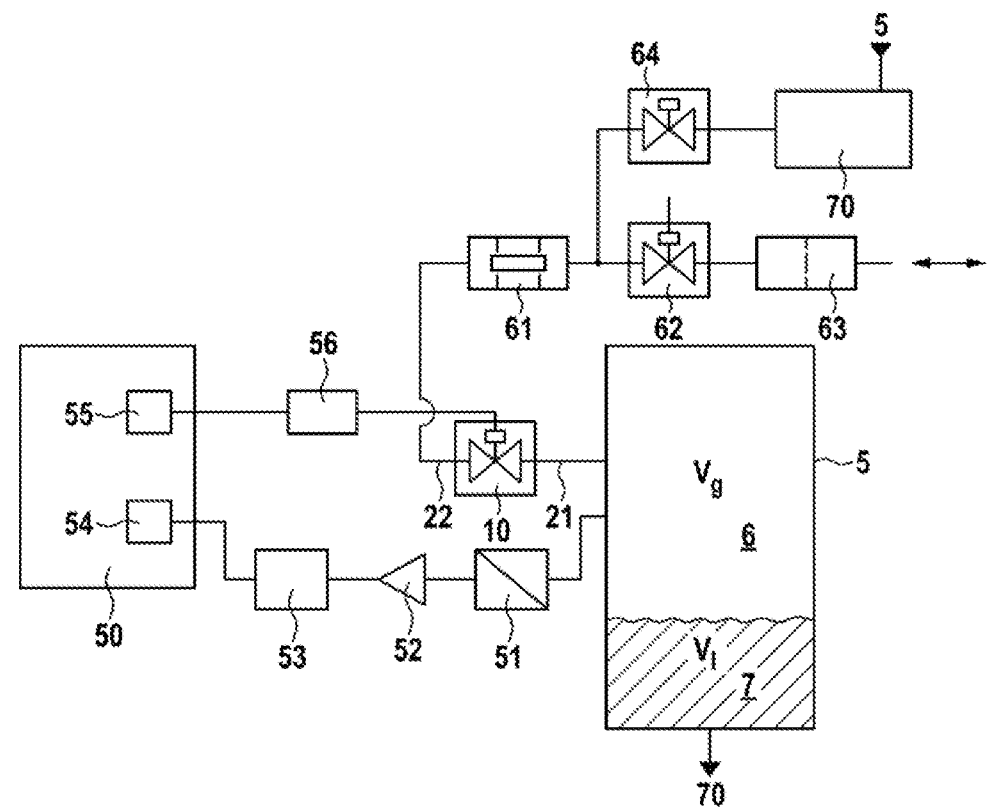
FIG. 6 shows an application of the control circuit diagram in FIG. 5.

A typical application of a valve 10 is depicted in FIG. 6. In general, the valve 10 is connected to a reservoir 5 and a controller 10 as already explained with reference to FIG. 5. Thus the description of FIG. 5 can be read as well on FIG. 6. Different from FIG. 5, the reservoir 5 is a fuel tank e.g. for supplying a combustion engine 70. The second port 22 of the valve 10 is connected to a filter 61, e.g. an inlet of an activated charcoal filter 61. Thus, if the valve 10 (below 'first valve 10') is open, gas from the fuel tank 5 can enter the activated charcoal filter 61. Volatile organic compounds are essentially removed by said In activated charcoal filter 61. The cleaned gas leaving the activated charcoal filter 61 may either escape to the environment via a second valve 62 (and a subsequent dust filter 63) or be provided via a third valve 64 to the air intake system of a combustion engine 70. If the gas 6 from the fuel tank 5 is provided to the combustion engine 70, the first valve 10 and the third valve 64 are each open. If the gas is provided to the combustion engine, the active charcoal filter may be bypassed as indicated by the dashed line. If fuel 7 is drawn from the fuel tank 5, the corresponding volume is to be replaced by air or another fluid to obtain a pressure compensation. Pressure compensation is as well essential in case of temperature changes. For pressure compensation (indicated by a double headed arrow) the first valve 10 and the second valve 62 are each opened. Air can enter the reservoir 5 by passing a dust filter 63, the second valve 62, the activated charcoal filter 61 and the first valve 10 or escape into the environment, depending on the pressure gradient. In some legislations, the second valve 62 can be omitted. In the figure, only the first valve 10 is controlled by the controller 10 (via the driver 56), but of course the other valves can be controlled in essentially the same may. The controller 50 can be configured to communicate via a bus system, e.g. via a CAN bus, Flexray or the like with other controllers, like e.g. an engine controller.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. An apparatus for altering a gas volume in a reservoir, the apparatus comprising:
   at least one valve having at least a first port being in fluid communication with the reservoir, a second port, and a conduit for enabling a liquid communication between the first port and the second port; and
   a valve member movable between at least an open position in which the first port and the second port are in fluid communication via said conduit, and a first closed position, in which the fluid communication between the first port and the second port is blocked by the valve member,
   wherein the valve member is movable into at least a second closed position, in which the fluid communication between the first port and the second port is blocked,
   wherein a volume of a chamber that is in liquid communication with the first port is altered when moving the valve member from the first closed position to the second closed position and/or from the second closed position to the first closed position,
   wherein a section of the conduit is provided by a bore that extends through the valve member,
   wherein the section of the conduit that extends through the valve member has at least a first opening being aligned with the first port and a second opening being aligned with the second port if the valve member is in the open position to thereby provide the fluid communication, and
   wherein when the valve member moves from the open position to the first closed position, the first opening of the section of the conduit that extends through the valve member moves out of alignment with the first port and the second opening of the section of the conduit that extends through the valve member moves out of alignment with the second port.

2. The apparatus of claim 1, wherein the apparatus further comprises a sensor providing a signal being representative for a force F required to move the valve member against a pressure in the reservoir from the first closed position to the second closed position and/or from the second closed position to the first closed position.

3. The apparatus claim 1, wherein the reservoir is a fuel tank and wherein the valve is:
   a Fuel Tank Isolation Valve for controlling a fluid communication between the reservoir and the environment;
   a Fuel Tank Vent valve for controlling a fluid communication between the reservoir and an engine air intake and/or a canister being in fluid communication with the environment;
   a Fuel Tank Separation Valve for isolating the reservoir from the engine, a canister and environment during canister purging;
   an Atmospheric Isolation Valve for isolating a canister and/or the reservoir from the atmosphere to prevent gas emissions after shutoff; or
   a Fuel Tank Shutoff Valve for controlling fluid communication between a combustion engine and the reservoir.

4. An apparatus for altering a gas volume in a reservoir, the apparatus comprising:
   at least one valve having at least a first port being in fluid communication with the reservoir, a second port, and a conduit for enabling a liquid communication between the first port and the second port; and
   a valve member movable between at least an open position in which the first port and the second port are in fluid communication via said conduit, and a first closed position, in which the fluid communication between the first port and the second port is blocked by the valve member, wherein the valve member is movable into at least a second closed position, in which the fluid communication between the first port and the second port is blocked, wherein a volume of a chamber that is in liquid communication with the first port is altered when moving the valve member from the first closed position to the second closed position and/or from the second closed position to the first closed position, and wherein the conduit comprises a valve seat and the valve member closes the valve seat in the first closed position and the second closed position and opens the valve seat in the open position, wherein an elastic gasket is positioned between the valve seat and the valve member, and wherein the elastic gasket is compressed when moving the valve member from the first closed position to the second closed position and is decompressed when moving the valve member from the second closed position to the first closed position.

5. The apparatus of claim 1, wherein the first port is in fluid communication with the chamber into which the valve member protrudes when the valve member is moved from the first closed position to the second closed position, and wherein a boundary of the chamber closes at least one of the first and/or second openings of the conduit when moving the valve member from the open position into the first closed position and/or the second closed position.

6. The apparatus of claim 1, wherein when the valve member moves from the first closed position to the second closed position, the first opening of the section of the conduit that extends through the valve member moves further out of alignment with the first port than when the valve member is in the first closed position and the second opening of the section of the conduit that extends through the valve member moves further out of alignment with the second port than when the valve member is in the first closed position.

7. The apparatus of claim 1, wherein the valve member is rotatable, such that the valve member rotates between the open position, the first closed position and the second closed position.

* * * * *